(12) United States Patent
von Eberstein

(10) Patent No.: US 9,908,594 B2
(45) Date of Patent: Mar. 6, 2018

(54) FLOTATION SYSTEM AND METHOD

(71) Applicant: Christopher Eric von Eberstein, Covington, LA (US)

(72) Inventor: Christopher Eric von Eberstein, Covington, LA (US)

(73) Assignee: Expert E&P Consultants, L.L.C., Madisonville, LA (US)

( * ) Notice: Subject to any disclaimer, the term of this patent is extended or adjusted under 35 U.S.C. 154(b) by 0 days.

(21) Appl. No.: 15/251,762

(22) Filed: Aug. 30, 2016

(65) Prior Publication Data

US 2017/0313389 A1    Nov. 2, 2017

Related U.S. Application Data

(60) Provisional application No. 62/329,899, filed on Apr. 29, 2016.

(51) Int. Cl.
*B63B 35/44* (2006.01)
*B63B 35/34* (2006.01)

(52) U.S. Cl.
CPC ............. *B63B 35/34* (2013.01); *B63B 35/44* (2013.01)

(58) Field of Classification Search
CPC ....... B63B 35/34; B63B 35/44; E21B 17/006; E21B 17/01; E21B 17/012; E21B 17/105; E21B 17/1064; E21B 17/1078; F16L 1/20; F16L 1/24; H02G 9/12
See application file for complete search history.

(56) References Cited

U.S. PATENT DOCUMENTS

| | | | |
|---|---|---|---|
| 3,729,756 A | 5/1973 | Cook et al. | |
| 3,768,842 A | 10/1973 | Ahistone | |
| 3,858,401 A | 1/1975 | Watkins | |
| 4,086,971 A | 5/1978 | Hall et al. | |
| 4,596,531 A | 6/1986 | Schawann et al. | |
| 4,653,960 A * | 3/1987 | Chun | B63B 35/44 |
| | | | 114/264 |
| 4,829,923 A | 5/1989 | Copson et al. | |
| 5,117,915 A | 6/1992 | Mueller et al. | |
| 5,181,571 A | 1/1993 | Mueller et al. | |
| 5,330,294 A | 7/1994 | Guesnon | |
| 5,676,209 A | 10/1997 | Reynolds | |
| 6,155,748 A | 12/2000 | Allen et al. | |

(Continued)

OTHER PUBLICATIONS

International Search Report and Written Opinion dated Jul. 3, 2017 from Applicant's counterpart International Patent Application No. PCT/US2017/27194.

*Primary Examiner* — Anthony D Wiest
(74) *Attorney, Agent, or Firm* — Jones Walker LLP

(57) ABSTRACT

A flotation system includes one or more floatation modules, each having a first section and a second section, each having an internal core made of a buoyant material. The first section includes two end faces and a projection extending from one of the end faces. The projection has a contoured profile. The second section includes two end faces and a reciprocal recess in one of the end faces. The end faces of the first section engage the end faces of the second section such that the projection engages the reciprocal recess in a mating engagement. A stop collar may be disposed adjacent each end of the floatation module. The floatation system may be attached to a tubular string that is lowered into a marine riser to reduce a load applied to a rig disposed over the marine riser.

33 Claims, 8 Drawing Sheets

(56) References Cited

U.S. PATENT DOCUMENTS

| | | |
|---|---|---|
| 6,270,387 B1 | 8/2001 | Nesheim |
| 6,443,244 B1 | 9/2002 | Collins |
| 6,488,447 B1 | 12/2002 | Nish et al. |
| 6,505,685 B1 | 1/2003 | Sullaway et al. |
| 7,214,114 B2 * | 5/2007 | Gibson ................. E21B 17/012 |
| | | 441/133 |
| 7,383,885 B2 | 6/2008 | Bergeron et al. |
| 9,022,827 B2 | 5/2015 | Snyder |
| 2001/0027878 A1 | 10/2001 | Roberts et al. |
| 2001/0030045 A1 | 10/2001 | Roberts et al. |
| 2003/0026663 A1 | 2/2003 | Guesnon et al. |
| 2003/0070814 A1 | 4/2003 | Sullaway et al. |
| 2003/0070815 A1 | 4/2003 | Sullaway et al. |
| 2003/0070816 A1 | 4/2003 | Sullaway et al. |
| 2004/0182611 A1 | 9/2004 | Ramey et al. |
| 2008/0274656 A1 | 11/2008 | Routeau et al. |
| 2008/0289829 A1 | 11/2008 | Bergeron et al. |
| 2011/0017516 A1 | 1/2011 | Gollmyer et al. |
| 2011/0174494 A1 | 7/2011 | Whitelaw et al. |
| 2012/0188696 A1 | 7/2012 | Gildseth et al. |
| 2013/0251457 A1 * | 9/2013 | Melymuk ................. F16L 1/24 |
| | | 405/171 |
| 2013/0280973 A1 * | 10/2013 | Elder ....................... F16L 1/24 |
| | | 441/133 |

* cited by examiner

FLOTATION SYSTEM AND METHOD

CROSS-REFERENCE TO RELATED APPLICATION

This application claims the benefit of and priority to U.S. Provisional Patent Application No. 62/329,899, filed on Apr. 29, 2016, which is incorporated by reference herein in its entirety.

BACKGROUND OF THE DISCLOSURE

This disclosure relates to a flotation module, system, and method for reducing the load force applied to an offshore platform by a tubular string.

SUMMARY OF THE DISCLOSURE

Described herein is an apparatus for reducing a load force applied to an offshore platform by a tubular string. The apparatus includes a flotation module. The flotation module has an internal core made of a buoyant material. The internal core forms an inner bore wall for accommodating the tubular string. The flotation module includes a first section, a second section, and an interlocking means. The first section has a C-shaped interior profile. The first section includes a base portion, a first leg portion, and a second leg portion. The base portion interconnects the first leg portion and the second leg portion of the first section. The first leg portion and second leg portion of the first section each have an end face. The second section has a C-shaped interior profile. The second section includes a base portion, a first leg portion, and a second leg portion. The base portion interconnects the first, leg portion and the second leg portion of the second section. The first leg portion and the second leg portion of the second section each have an end face. The interlocking means is configured to slidably engage the first and second sections into an operative arrangement about the tubular string by detachably interlocking the end faces of the first and second leg portions of the first section to the end faces of the first and second leg portions of the second section.

In one embodiment, the interlocking means includes a first projection and a first recess. The first projection extends from the end face of the first leg portion of the first section. The first projection has a contoured profile with a smaller diameter proximal section and a larger diameter distal section. The first recess is positioned within the end face of the first leg portion of the second section. The first recess is shaped to slidably receive the contoured profile of the first projection and provide an interlocking dovetail joint between the first and second sections.

In a further embodiment, the interlocking means also includes a second projection and a second recess. The second projection extends from the end face of the second leg portion of the second section. The second projection has a contoured profile with a smaller diameter proximal section and a larger diameter distal section. The second recess is positioned within the end face of the second leg portion of the first section. The second recess is shaped to slidably receive the contoured profile of the second projection and provide an interlocking dovetail joint between the first and second sections.

In another embodiment, the interlocking means also includes a second projection and a second recess. In this embodiment, the second projection extends from the end face of the second leg portion of the first section. The second projection has a contoured profile with a smaller diameter proximal section and a larger diameter distal section. In this embodiment, the second recess is positioned within the end face of the second leg portion of the second section. The second recess is shaped to slidably receive the contoured profile of the second projection and provide an interlocking dovetail joint between the first and second sections.

In one embodiment, each end face of the first and second leg portions of the first section includes an upper section with a planar surface and a lower section with a planar surface; the planar surface of the upper section extends outwardly beyond the planar surface of the lower section. In this embodiment, each end face of the first and second leg portions of the second section includes an upper section with a planar surface and a lower section with a planar surface; the planar surface of the lower section extends outwardly beyond the planar surface of the upper section. Also, in this embodiment, the interlocking means includes a first projection, a second projection, a third projection, a fourth projection, a first recess, a second recess, a third recess, and a fourth recess. The first projection extends from the planar surface of the upper section of the end face of the first leg portion of the first section. The first projection has a contoured profile with a smaller diameter proximal section and a larger diameter distal section. The second projection extends from the planar surface of the upper section of the end face of the second leg portion of the first section. The second projection has a contoured profile with a smaller diameter proximal section and a larger diameter distal section. The third projection extends from the planar surface of the upper section of the end face of the first leg portion of the second section. The third projection has a contoured profile with a smaller diameter proximal section and a larger diameter distal section. The fourth projection extends from the planar surface of the upper section of the end face of the second leg portion of the second section. The fourth projection has a contoured profile with a smaller diameter proximal section and a larger diameter distal section. The first recess is positioned within the planar surface of the lower section of the end face of the first leg portion of the first section. The first recess is shaped to slidably receive the contoured profile of the fourth projection and provide an interlocking dovetail joint between the first and second sections. The second recess is positioned within the planar surface of the lower section of the end face of the second leg portion of the first section. The second recess is shaped to slidably receive the contoured profile of the third projection and provide an interlocking dovetail joint between the first and second sections. The third recess is positioned within the planar surface of the lower section of the end face of the first leg portion of the second section. The third recess is shaped to slidably receive the contoured profile of the second projection and provide an interlocking dovetail joint between the first and second sections. The fourth recess is positioned within the planar surface of the lower section of the end face of the second leg portion of the second section. The fourth recess is shaped to slidably receive the contoured profile of the first projection and provide an interlocking dovetail joint between the first and second sections.

In another embodiment, the flotation module has a cylindrical outer surface.

In a further embodiment, the cylindrical outer surface of the flotation module includes a protective outer layer.

In a still further embodiment, the protective outer layer is bonded to the internal core and the protective outer layer has a thickness in the range of 7 to 10 mm.

In yet a further embodiment, the protective outer layer is formed of polyurethane.

In one embodiment, the buoyant material in the internal core of the flotation module is a syntactic foam.

In another embodiment, the flotation module has a length in the range of 1 to 10 feet.

In yet another embodiment, the flotation module has an outer diameter in the range of 14 to 22 inches.

In one embodiment, the inner bore wall of the internal core has an inner diameter in the range of 2 to 8 inches.

In another embodiment, the flotation module includes an RFID chip.

In still another embodiment, the flotation module further includes a locking device securing the first section to the second section.

In one embodiment where the interlocking means includes a first projection extending from the end face of the first leg portion of the first section and a first recess positioned within the end face of the first leg portion of the second section, the contoured profile of the first projection is tapered.

In one embodiment where the interlocking means includes a first projection extending from the end face of the first leg portion of the first section, a second projection extending from the end face of the second leg portion of the second section, a first recess positioned within the end face of the first leg portion of the second section, and a second recess positioned within the end face of the second leg portion of the first section, the contoured profile of the first and second projections are each tapered.

In one embodiment where the interlocking means includes a first projection extending from the end face of the first leg portion of the first section, a second projection extending from the end face of the second leg portion of the first section, a first recess positioned within the first leg portion of the second section, and a second recess positioned within the end face of the second leg portion of the second section, the contoured profile of the first and second projections are each tapered.

In one embodiment where the interlocking means includes a first projection, a second projection, a third projection, and a fourth projection, the first, second, third, and fourth projections are each tapered.

In another embodiment, the flotation module further includes a stepped section positioned between the upper and lower sections of each end face of the first and second leg portions of the first and second sections. Each stepped section includes a central-planar surface portion, a lower shoulder, and an upper shoulder. The central-planar surface portion has a top edge and a bottom edge. The lower shoulder is positioned at the bottom edge of the central-planar surface portion and extends to the planar surface of the lower section. The upper shoulder is positioned at the top edge of the central-planar surface portion and extends to the planar surface of the upper section. In this embodiment, when the first and second sections are slidably engaged in the operative arrangement: the lower shoulder of the stepped section of the end face of the second leg portion of the second section abuts the upper shoulder of the stepped section of the end face of the first leg portion of the first section, the upper shoulder of the stepped section of the end face of the second leg portion of the second section abuts the lower shoulder of the stepped section of the end face of the first leg portion of the first section, the lower shoulder of the stepped section of the end face of the first leg portion of the second section abuts the upper shoulder of the stepped section of the end face of the second leg portion of the first section, and the upper shoulder of the stepped section of the end face of the first leg portion of the second section abuts the lower shoulder of the stepped section of the end face of the second leg portion of the first section.

Also described herein is a system for reducing a load force applied to an offshore platform by a tubular string. The system includes a plurality of flotation modules positioned about the tubular string in a stacked arrangement to form a first series of stacked flotation modules. The first series of stacked flotation modules has an uppermost flotation module and a lowermost flotation module. Each flotation module has a top end, a bottom end, an outer surface, and an internal core. The internal core is made of a buoyant material. The internal core forms an inner bore wall for accommodating the tubular string. Each flotation module includes a first section, a second section, an interlocking means, an upper stop collar, and a lower stop collar. The first section of the flotation module has a C-shaped interior profile. The first section of the flotation module includes a base portion, a first leg portion and a second leg portion. The base portion of the first section of the flotation module interconnects the first leg portion to the second leg portion. The first leg portion and second leg portion of the first section of the flotation module each have an end face. The second section of the flotation module has a C-shaped interior profile. The second section of the flotation module includes a base portion, a first leg portion, and a second leg portion; the base portion interconnects the first leg portion and the second leg portion. The first leg portion and the second leg portion of the second section of the flotation module each has an end face. The interlocking means is configured to slidably engage the first and second sections of the flotation module into an operative arrangement about the tubular string by detachably interlocking the end faces of the first and second leg portions of the first section to the end faces of the first and second leg portions of the second section. Each of the upper and lower stop collars has a top end, a bottom end, an outer surface, and an internal portion. The internal portion of the upper and lower stop collars forms an inner bore wall for accommodating the tubular string. Each of the upper and lower stop collars includes a first section, a second section, and a securing means. The first section of the upper and lower stop collars has a C-shaped interior profile. The first section of the upper and lower stop collars includes a base portion, a first leg portion, and a second leg portion; the base portion interconnects the first leg portion and the second leg portion. The first and second leg portions of the first section of the upper and lower stop collars each has an end face. The second section of the upper and lower atop collars has a C-shaped interior profile. The second section of the upper and lower stop collars includes a base portion, a first leg portion, and a second leg portion; the base portion interconnects the first leg portion and the second leg portion. The first and second leg portions of the second section of the upper and lower stop collars each has an end face. The securing means of the upper and lower stop collars is configured to detachably secure the first and second sections of each of the upper and lower stop collars together in an operative arrangement about the tubular string. The upper stop collar is secured about the tubular string at an upper end of the first series of stacked flotation modules such that the bottom end of the upper stop collar abuts the top end of the uppermost flotation module in the first series of stacked flotation modules. The lower stop collar is secured about the tubular string at a lower end of the first series of slacked flotation modules such that the bottom end of the lower stop collar abuts the bottom end of the lowermost flotation module in the first series of stacked flotation modules.

In a further embodiment, the internal portion of each of the upper and lower stop collars includes a polymer composite frame structure.

In a further embodiment, the outer surface of each of the upper and lower stop collars is conically shaped.

In a still further embodiment, the outer surface of each of the upper and lower stop collars includes a protective outer layer.

In a further embodiment, the protective outer layer of the outer surface of the upper and lower stop collars is bonded to the composite frame structure and has a thickness in the range of 7 to 10 mm.

In a still further embodiment, the protective outer layer is formed of polyurethane.

In one embodiment, the system includes a second series of stacked flotation modules spaced apart front the first series of stacked flotation modules.

In another embodiment of the system, each end face of the first and second leg portions of the first section of the flotation module includes an upper section with a planar surface and a lower section with a planar surface; the planar surface of the upper section extends beyond the planar surface of the lower section. In this embodiment, each end face of the first and second leg portions of the second section includes an upper section with a planar surface and a lower section with a planar surface; the planar surface of the lower section extends outwardly beyond the planar surface of the upper section. Also, in this embodiment the interlocking means includes a first projection, a second projection, a third projection, a fourth projection, a first recess, a second recess, a third recess, and a fourth recess. The first projection extends from the planar surface of the upper section of the end face of the first leg portion of the first section; the first projection has a contoured profile with a smaller diameter proximal section and a larger diameter distal section. The second projection extends from the planar surface of the upper section of the end face of the second leg portion of the first section; the second projection has a contoured profile with a smaller diameter proximal section and a larger diameter distal section. The third projection extends from the planar surface of the upper section of the end face of the first leg portion of the second section; the third projection has a contoured profile with a smaller diameter proximal section and a larger diameter distal section. The fourth projection extends from the planar surface of the upper section of the end face of the second leg portion of the second section; the fourth projection has a contoured profile with a smaller diameter proximal section and a larger diameter distal section. The first recess is positioned within the planar surface of the lower section of the end face of the first leg portion of the first section. The first recess is shaped to slidably receive the contoured profile of the fourth projection and provide an interlocking dovetail joint between the first and second sections. The second recess is positioned within the planar surface of the lower section of the end face of the second leg portion of the first section. The second recess is shaped to slidably receive the contoured profile of the third projection and provide an interlocking dovetail joint between the first and second sections. The third recess is positioned within the planar surface of the lower section of the end face of the first leg portion of the second section. The third recess is shaped to slidably receive the contoured profile of the second projection and provide an interlocking dovetail joint between the first and second sections. The fourth recess is positioned within the planar surface of the lower section of the end face of the second leg portion of the second section. The fourth recess is shaped to slidably receive the contoured profile of the first projection and provide an interlocking dovetail joint between the first and second sections.

In a further embodiment, the first, second, third, and fourth projections are each tapered.

In a still further embodiment, the flotation module also includes a stepped section positioned between the upper and lower sections of each end face of the first and second leg portions of the first and second sections. Each stepped section includes a central-planar surface portion, a lower shoulder, and an upper shoulder. The central-planar surface portion has a top edge and a bottom edge. The lower shoulder is disposed at the bottom edge of the central-planar surface portion and extends to the planar surface of the lower section. The upper shoulder is disposed at the top edge of the central-planar surface portion and extends to the planar surface of the upper section. In this embodiment, when the first and second sections are slidably engaged in the operative arrangement: the lower shoulder of the stepped section of the end face of the second leg portion of the second section abuts the upper shoulder of the stepped section of the end face of the first leg portion of the first section, the upper shoulder of the stepped section of the end face of the second leg portion of the second section abuts the lower shoulder of the stepped section of the end face of the first leg portion of the first section, the lower shoulder of the stepped section of the end face of the first leg portion of the second section abuts the upper shoulder of the stepped section of the end face of the second leg portion of the first section, and the upper shoulder of the stepped section of the end face of the first leg portion of the second section abuts the lower shoulder of the stepped section of the end face of the second leg portion of the first section.

Also described herein is a method for reducing a load force applied to an offshore platform by a tubular string. The method includes the steps of: (a) providing a flotation system that may include a plurality of flotation modules positioned about the tubular string in a stacked arrangement to form a first series of stacked flotation modules and (b) lowering the tubular string through a subsurface conduit and having the load force applied to the offshore platform reduced by the tubular string due to a buoyancy effect of the first series of stacked flotation modules. The first series of stacked flotation modules has an uppermost flotation module and a lowermost flotation module. Each flotation module has a top end, a bottom end, an outer surface, and an internal core. The internal core is made of a buoyant material. The internal core forms an inner bore wall for accommodating the tubular string. Each of the flotation modules includes a first section, a second section, an interlocking means, an upper stop collar and a lower stop collar. The first section of the flotation module has a C-shaped interior profile. The first section of the flotation module includes a base portion, a first leg portion, and a second leg portion; the base portion interconnects the first leg portion and the second leg portion. The first and second leg portions of the first section of the flotation module each has an end face. The second section of the flotation module has a C-shaped interior profile. The second section of the flotation module includes a base portion, a first leg portion, and a second leg portion; the base portion interconnects the first leg portion and the second leg portion. The first and second leg portion of the second section of the flotation module each has an end face. The interlocking means is configured to slidably engage the first and second sections into an operative arrangement about the tubular string by detachably interlocking the end faces of the first and second leg portions of the first section of the flotation module to the end faces of the first and second leg portions of the second section of the flotation module. Each of the upper and lower stop collars has a top end, a bottom end, an outer surface, and an internal portion forming an inner bore wall for accommodating the tubular string. Each of the upper and lower stop collars includes a first section, a second section, and a securing means. The first section of the upper and lower stop collars has a C-shaped interior profile. The first section of the upper and lower stop collars includes a base portion, a first leg portion, and a second leg portion; the base portion interconnects the first leg portion to the second leg portion. The first and second leg portions of the first section of the upper and lower stop collars each has an end face. The second section of the upper and lower stop collars has a C-shaped interior profile, a base portion, a first leg portion, and a second leg portion; the base portion interconnects the first leg portion and the second leg portion. The first and second leg portion of the second section of the upper and lower stop collars each has an end face. The securing means is configured to detachably secure the first and second sections of each of the upper and lower stop collars together in operative arrangement about the tubular string. The upper end of the stop collar is secured about the tubular string at an upper end of the first series of stacked flotation modules such that the bottom end of the upper stop collar abuts the top end of the uppermost flotation module in the first series of stacked flotation modules. The lower stop collar is secured about the tubular string at a lower end of the first series of stacked flotation modules such that the bottom end of the lower stop collar abuts the bottom end of the lowermost flotation module in the first series of stacked flotation modules.

In a further embodiment of the method, the subsurface conduit is a marine riser.

In a still further embodiment, the method also includes the step of providing a second series of slacked flotation modules on the tubular string spaced apart from the first series of stacked flotation modules.

In a further embodiment, the method includes the step of lifting the tubular string through the marine riser. In this embodiment, the load force applied to the offshore platform by the tubular string is reduced due to a buoyancy effect of the first and second series of stacked flotation modules.

DETAILED DESCRIPTION OF THE DISCLOSURE

Figure 4A:
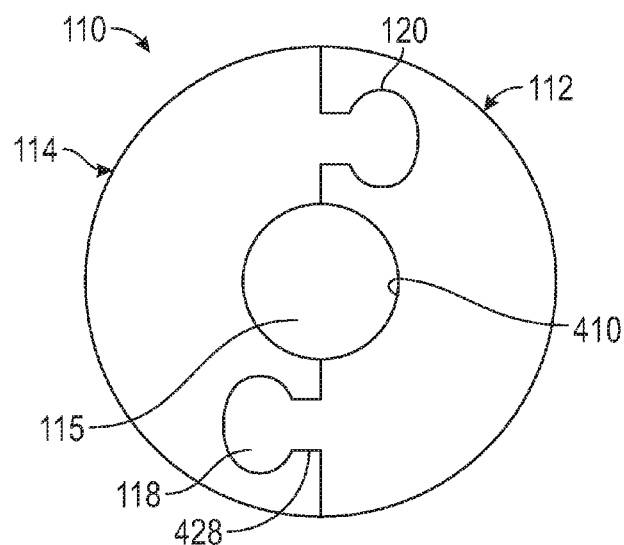
FIG. 4A is an end view of another embodiment of the flotation module.
Figure 4B:
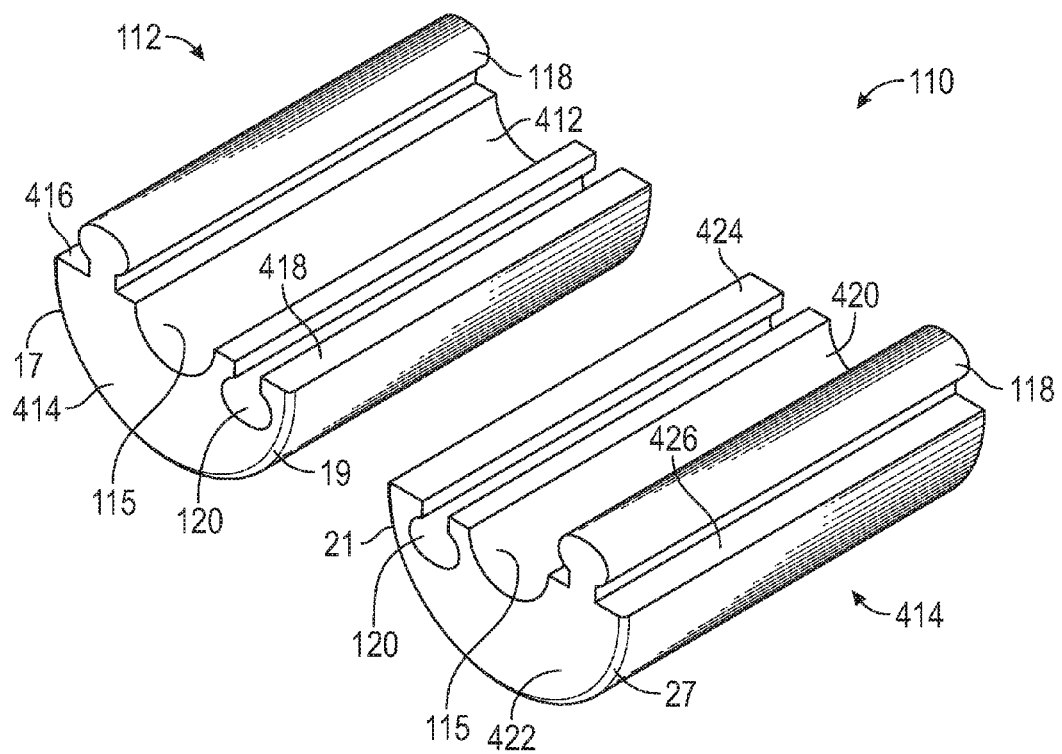
FIG. 4B is a perspective view of the first and second sections of the flotation module shown in FIG. 4A.
Figure 5A:
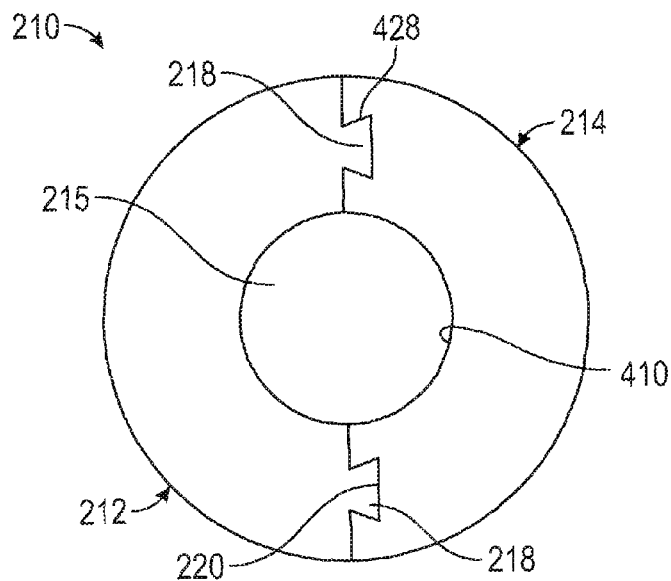
FIG. 5A is an end view of another embodiment of the flotation module.
Figure 5B:
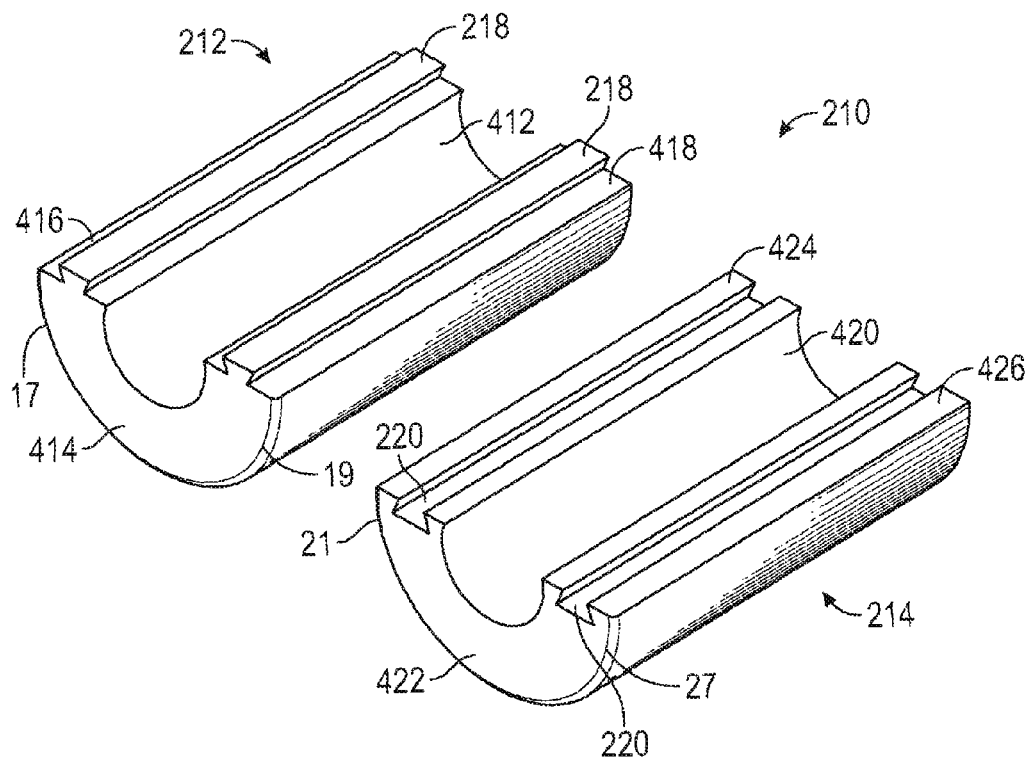
FIG. 5B is a perspective view of the first and second sections of the flotation module shown in FIG. 5A.
Figure 6:
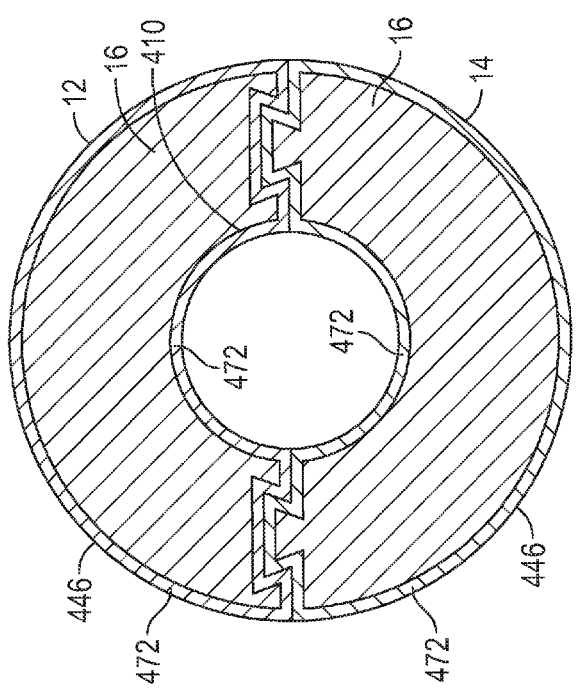
FIG. 6 is a cross-sectional view of the flotation module shown in FIG. 1.

As shown in FIGS. 1-6, flotation module 10 contains a first section 12 and a second section 14. A flotation module 10 with a bore 15 is formed when the first section 12 and second section 14 are joined together. First section 12 and second section 14 may each have an internal core 16. Internal core 16 may be made of a buoyant material. In one embodiment, the buoyant material is formed of a syntactic foam, as for example, syntactic foam commercially available from CRP Corporation under the name syntactic foam. The flotation module 10 may have an outer surface 446 as shown in FIG. 6. In one embodiment, the outer surface 446 includes a protective outer layer 472 as shown in FIG. 6. In a further embodiment, the protective outer layer 472 may be bonded onto the exterior surface of the buoyant material. In one embodiment, the protective outer layer 472 is formed of polyurethane. In one embodiment, the protective outer layer 472 is approximately 7-10 millimeters thick.

In one embodiment, first section 12 and second section 14 are half-cylinders. In a further embodiment, as shown in FIGS. and 6, when the first section 12 and second section 14 are joined, the flotation module 10 has an outer surface 446 that is cylindrical.

As shown in FIGS. 1-6, first section 12 and second section 14 may each have a c-shaped interior profile 412, 420 when viewed from the end. First section 12 and second section 14 may be joined together to form a bore 15. Bore 15 includes an inner bore wall 410 for accommodating the tubular string 29. First and second sections 12, 14 may include an interlocking means that is configured to slidably engage the first and second sections 12, 14 into an operative arrangement. The interlocking means detachably interlocks the end faces 416, 418, 424, 426 of the first and second sections 12, 14. In one embodiment, the interlocking means includes projections 18 and reciprocal recesses 20 on the adjoining end faces 416, 426 and 418, 424 of the c-shaped members 12, 14. For example, first section 12 may include one or more projections 18 that engage reciprocal recesses 20 of second section 14 to secure first and second sections 12, 14 together. Alternatively, second section 14 may include one or more projections 18 that engage reciprocal recesses 20 of first section 12 to secure first and second sections 12, 14 together. In another embodiment, first and second sections 12, 14 may each include a projection 18 that engages a reciprocal recess 20 on the other section.

The projections 18 and recesses 20 may be elongated along the longitudinal axis of first and/or second sections 12, 14. In one embodiment, the projections 18 and reciprocal recesses 20 may extend along the entire length of first and second sections 12, 14. In other embodiments, the projections 18 and recesses 20 may extend along only a portion of the length of first and second sections 12, 14. The recesses 20 are shaped reciprocally relative to the projections 18. The projections 18 may have a contoured profile 428 with a smaller diameter proximal section and a larger diameter distal section. For example, a width of the projection's 18 profile at a first point that is adjacent to the end face 416, 418, 424, 426 of the first or second section 12, 14 is less than a width of the projection 18 at a second point that is spaced apart from the end face 416, 418, 424, 426 of first or second section 12, 14, with the second point being any point on the projection 18 beyond the first point (e.g., the second point may be at a distal end of the projection's 18 profile or any point between the distal end and the end face 416, 418, 424, 426, such as ¼ distance, ⅓ distance, ½ distance, or ¾ distance). In one embodiment, as shown in FIGS. 1-3 and 5A-5B, the projections 18 have a tapered shape such that the projections 18 and reciprocal recesses 20 form a dovetail joint between the first and second sections 12, 14. In another embodiment, as shown in FIGS. 4A and 4B, the projections 18 may be shaped such that the projection 18 has a rounded profile.

Figure 1:
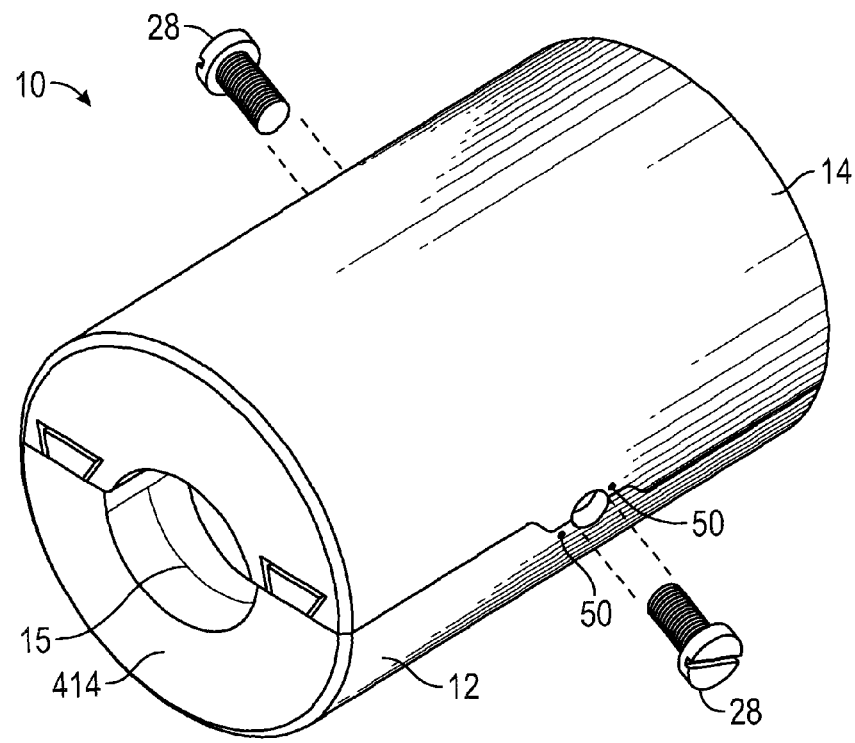
FIG. 1 is a perspective view of an embodiment of a flotation module.
Figure 2:
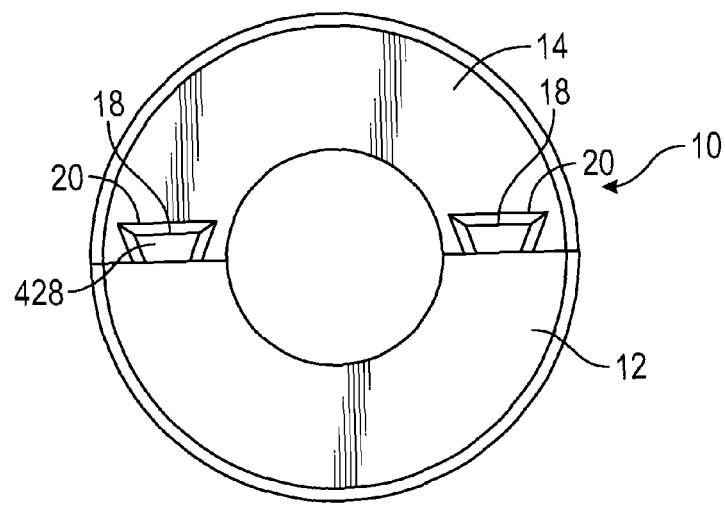
FIG. 2 is an end view of the flotation module shown in FIG. 1.
Figure 3:
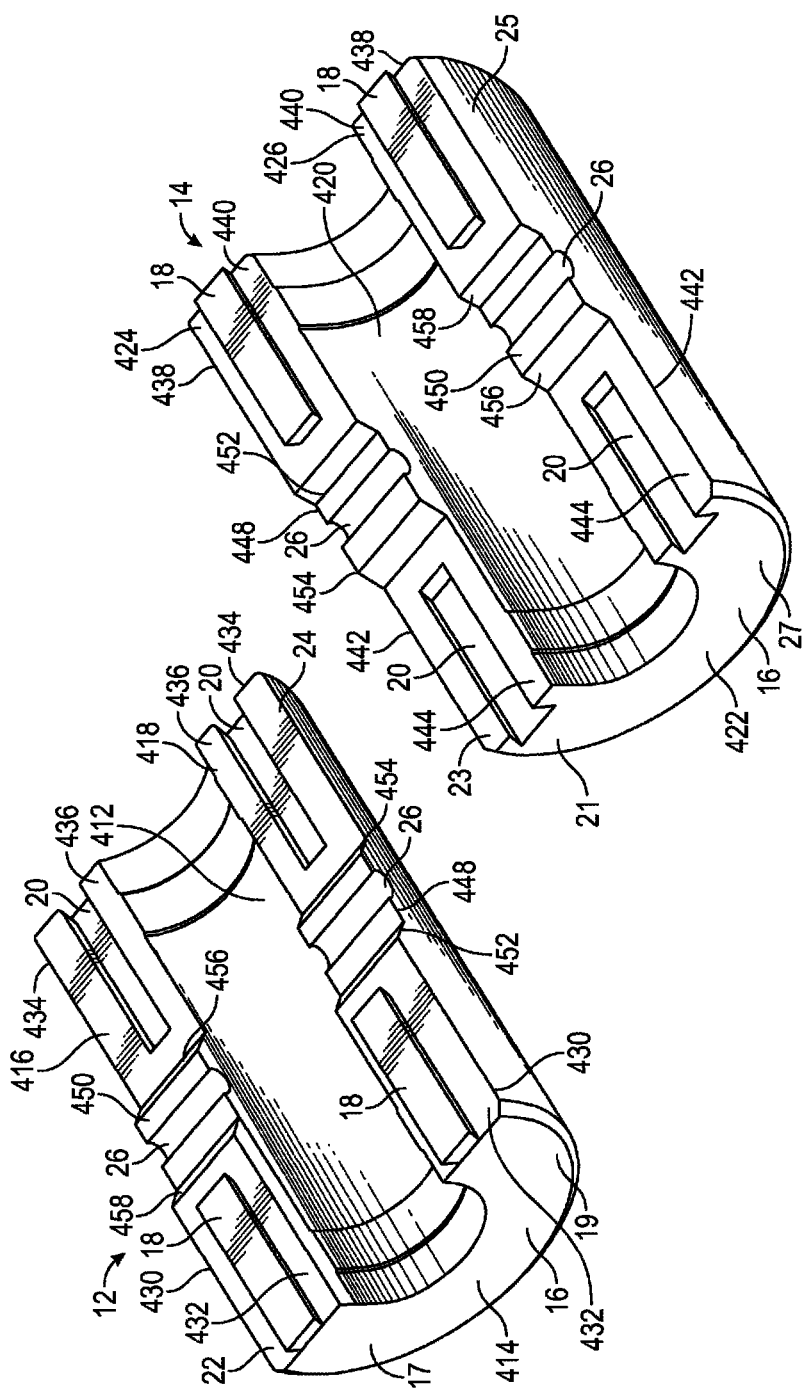
FIG. 3 is a perspective view of the first and second sections of the flotation module shown in FIG. 1.

In the embodiment shown in FIGS. 1-3, first section 12 has a first end 22, a second end 24, a base portion 414, a first leg portion 17, and a second leg portion 19. The base portion 414 interconnects the first leg portion 17 and the second leg portion 19. Both first leg portion 17 and second leg portion 19 each includes an end face 416, 418. Second section 14 has a first end 23, a second end 25, a base portion 422, a first leg portion 21, and a second leg portion 27. The base portion 422 interconnects the first leg portion 21 and the second leg portion 27. Both first leg portion 21 and second leg portion 27 each includes an end face 424, 426. First section 12 and second section 14 may each include projections 18 located on and reciprocal recesses 20 located within the end faces 416, 418, 424, 426 of the first and second leg portions 17, 19, 21, 27. Tapered projections 18 are located on the end faces 416, 418 on first end 22 of first section 12, with one tapered projection 18 located on each end face 416, 418. Tapered projections 18 are located on the end faces 424, 426 on second end 25 of second section 14, with one tapered projection 18 being located on each end face 424, 426. Reciprocal recesses 20 are located within the end faces 416, 418 on second end 24 of first section 12, with one reciprocal recess 20 being located within each end face 416, 418. Reciprocal recesses 20 are located within the end faces 424, 426 on first end 23 of second section 14, with one reciprocal recess 20 being located within each end face 424, 426. Tapered projections 18 and reciprocal recesses 20 are configured such that tapered projections 18 are configured to be slidably received into reciprocal recesses 20 of another section 12, 14 in a retaining engagement. To join first section 12 to second section 14, the tapered projections 18 located on the first end 22 of first section 12 are inserted into the reciprocal recesses 20 located on the first end 23 of second section 14. Tapered projections 18 located on the second end 25 of second section 14 are also inserted into the reciprocal recesses 20 located on the second end 24 of first section 12. In this way, the first section 12 and second section 14 in FIGS. 1-3 are joined in an interlocking dovetail arrangement.

In one embodiment, as shown in FIGS. 1-3, each end face 416, 418 of the first and second leg portions 17, 19 of the first section 12 may include an upper section 430 and a lower section 434. Both the upper section 430 and the lower section 434 have a planar surface 432, 436. The planar surface 432 of the upper section 430 extends outwardly beyond the planar surface 436 of the lower section 434. Each end face 424, 428 of the first and second leg portions 21, 27 of the second section 14 may also include an upper section 438 and a lower section 442. Both the upper and lower section 438, 442 have planar surfaces 440, 444. The planar surface 440 of the upper section 438 extends outwardly beyond the planar surface 444 of the lower section 442. In this embodiment: a projection 18 extends from the planar surface 432 of the upper section 430 of the end face 416 of the first leg portion 17 of the first section 12, a projection 18 extends from the planar surface 432 of the upper section 430 of the end face 418 of the second leg portion 19 of the first section 12, a projection 18 extends from the planar surface 440 of the upper section 438 of the end face 424 of the first leg portion 21 of the second section 14, and a projection 18 extends from the planar surface 440 of the upper section 438 of the end face 426 of the second leg portion 27 of the second section 14. Also in this embodiment: a recess 20 shaped to slidably receive the projection 18 located on second leg portion 27 of the second section 14 is positioned within the planar surface 436 of the lower section 434 of the end face 416 of the first leg portion 17 of the first section 12, a recess 20 shaped to slidably receive the projection 18 located on the first leg portion 21 of the second section 14 is positioned within the planar surface 436 of the lower section 434 of the end face 418 of the second leg portion 19 of the first section 12, a recess 20 shaped to slidably receive projection 18 located on the second leg portion 19 of first section 12 is positioned within the planar surface 444 of the lower section 442 of the end face 424 of the first leg portion 21 of the second section 14, and a recess 20 shaped to slidably receive projection 18 located on the first leg portion 17 of the first section 12 is positioned within the planar surface 444 of the lower section 442 of the end face 426 of the second leg portion 27 of the second section 14. In a further embodiment, the projections 18 have a contoured profile 428 with a smaller diameter proximal section and a larger diameter distal section.

As shown in FIG. 3, in a further embodiment, a stepped section 448 may be positioned between the upper and lower sections 430, 438 and 434, 442 of each end face 416, 418, 424, 426 of the first and second leg portions 17, 21 and 19, 27 of the first and second sections 12, 14. Each stepped section 448 includes a central-planar surface portion 450, a lower shoulder 456, and an upper shoulder 458. The central-planar surface portion 450 has a top edge 452 and a bottom edge 454. The lower shoulder 456 is positioned at the bottom edge 454 of the central-planar surface portion 450 and extends to the planar surface 436 of the lower section 434. The upper shoulder 458 is positioned at the top edge 452 of the central-planar surface portion 450 and extends to the planar surface 432 of the upper section 430. In this embodiment, when the first and second sections 12, 14 are slidably engaged in the operative arrangement: the lower shoulder 456 of the stepped section 448 of the end face 426 of the second leg portion 27 of the second section 14 abuts the upper shoulder 458 of the stepped section 448 of the end face 416 of the first leg portion 17 of the first section 12; the upper shoulder 458 of the stepped section 448 of the end face 426 of the second leg portion 27 of the second section 14 abuts the lower shoulder 456 of the stepped section 448 of the end face 416 of the first leg portion 17 of the first section 12; the lower shoulder 456 of the stepped section 448 of the end face 424 of the first leg portion 21 of the second section 14 abuts the upper shoulder 458 of the stepped section 448 of the end face 418 of the second leg portion 19 of the first section 12; and the upper shoulder 458 of the stepped section 448 of the end face 424 of the first leg portion 21 of the second section 14 abuts the lower shoulder 456 of the stepped section 448 of the end face 418 of the second leg portion 19 of the first section 12.

In one embodiment, first section 12 and second section 14 each may have a length in the range of 1 to 10 feet. In another embodiment, first, and second sections 12, 14 may each have a length of about 2 feet. In one embodiment, when first section 12 and second section 14 are joined together, the outer diameter of flotation module 10 may be in the range of 14 to 22 inches. In an embodiment, the outer diameter of flotation module 10 may be between 15 and 17 inches. In one embodiment, when first section 12 and second section 14 are joined together, the diameter of the inner bore wall 410 may be in the range of 2 to 8 inches. However, the external and internal diameter of flotation module 10 can be sized to accommodate tubular strings 29 of different diameters. Additionally, the length of the first section 12 and second section 14 can be any length as long as it does not buckle if the tubular string 29, about which the first and second sections 12, 14 are arranged, flexes.

Flotation module 10 is self-locking due to the interlocking feature of the projections 18 and recesses 20 that when slidably engaged provide a dovetail joint between the first and sections 12, 14 of flotation module 10. While not necessary, flotation module 10 may be equipped with a back-up locking means. For example, flotation module 10 may include a locking device. The locking device may be any mechanism that detachably secures first and second sections 12, 14 together. For instance, the locking device may be a locking pin, bolt, screw, plug, or like device.

As seen in FIG. 1-3, the locking device may be locking pin 28 configured to be received in a bore formed by half pin bores 26 located on first section 12 and the second section 14. In this embodiment, first section 12 and second section 14 each have at least one half bore 26. Half bores 26 may be located between projections 18 and recesses 20 on the end faces 416, 418, 424, 426 of first and second sections 12, 14. Alternatively, half bores 26 may be positioned in a central region along the length of each of first leg portions 17, 21 and second leg portions 19, 27 of first and second sections 12, 14. When first section 12 and second section 14 are joined together, the half bores 26 on each section substantially align with the half bores 26 on the other section to form bores. The bores are configured to receive a locking pin 28. Locking pin 28 is inserted into the bore to lock first section 12 and second section 14 together. In one embodiment, locking pin 28 is mark from a polymer composite, as for example, PA66+50% GF.

Figure 7:
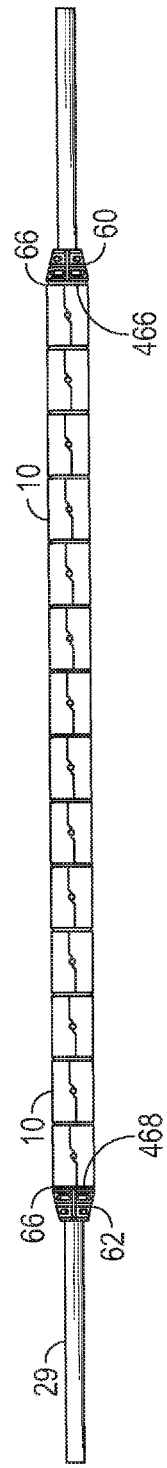
FIG. 7 is a side view of an embodiment of the flotation system positioned on a tubular string.

As shown in FIG. 7, a flotation system may include a plurality of flotation modules 10 configured to be secured in at least one series about a tubular siring 29. As used herein, "plurality" means two or more. In one embodiment, the tubular string 29 may be a landing string. It should be noted, that while fourteen flotation modules 10 are shown in FIG. 7, the actual number of flotation modules 10 placed on a tubular string 29 can vary. In fact, with some tubular strings 29, it is possible to alternate the placement of the flotation modules 10 amongst various joints. The actual number of flotation modules 10, length of the flotation modules 10, number of series of flotation modules 10, and thickness of the buoyancy material will depend on specific design criteria. Many design criteria can be considered, such as the amount of weight reduction required, and rig or platform space. The flotation modules 10 provide buoyancy to the tubular string 29, which can be run into the marine riser 322 using conventional means known to those of ordinary skill in the art.

Figure 8:
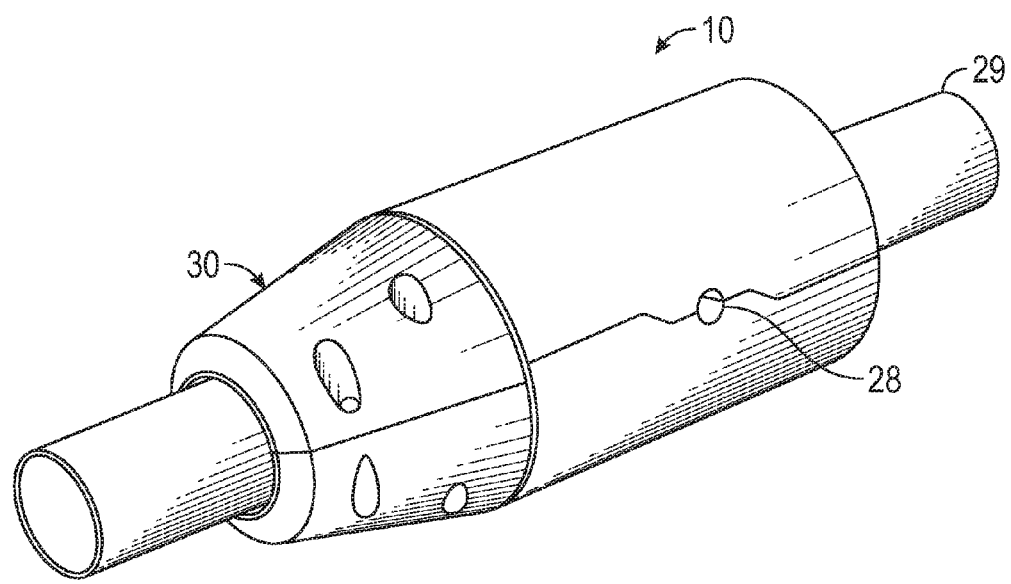
FIG. 8 is a perspective view of an embodiment of stop collar and flotation module of the flotation system positioned on a tubular string.
Figure 9:
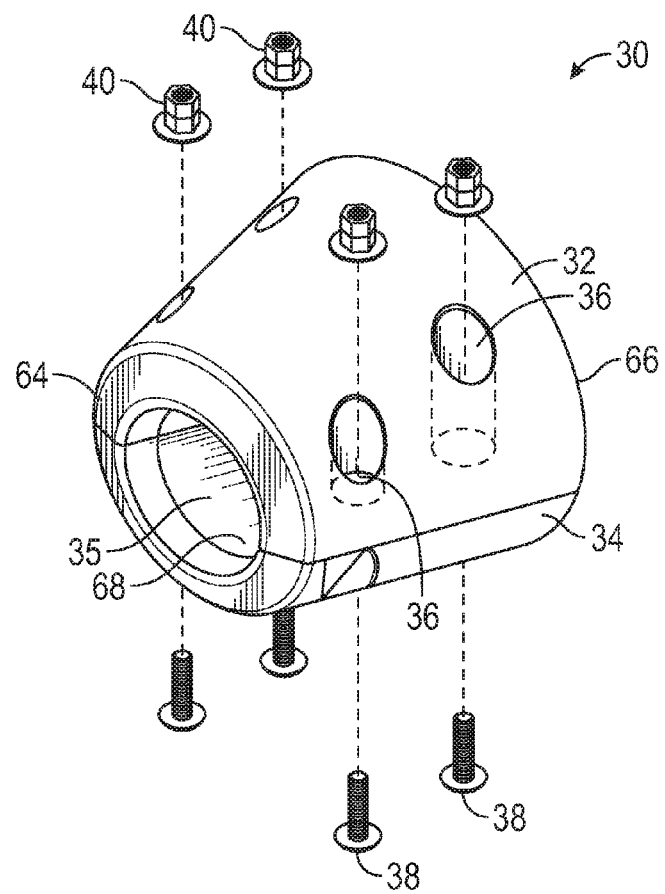
FIG. 9 is a partially exploded view of an embodiment of the stop collar of the flotation system.
Figure 10:
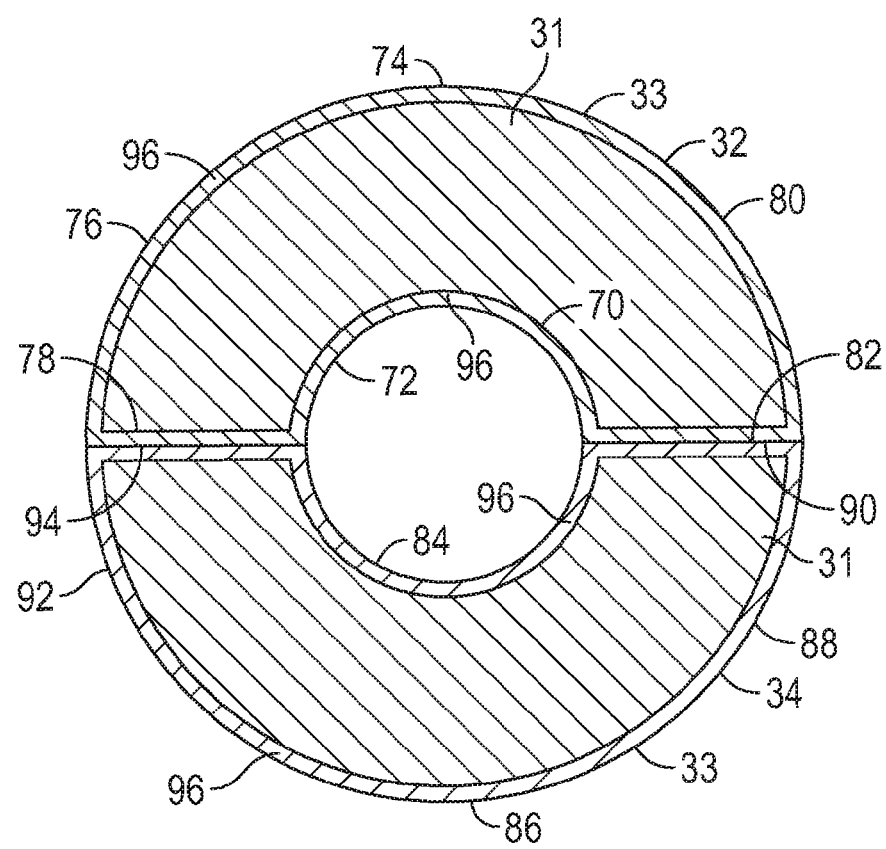
FIG. 10 is a cross-sectional view of the stop collar shown in FIG. 9.

The flotation system may further include stop collars 30 configured to be secured at opposing ends of the series of flotation modules 10, as shown in FIG. 7. If only one flotation module 10 is used, then stop collars 30 would be placed on either side of the single flotation module 10. As shown in FIGS. 8-10, stop collars 30 include first section 32 and second section 34. A conical-shaped member 30 with a bore 35 is formed when the first section 32 and second section 34 are joined together. When the stop collars 30 are positioned at opposing ends of a series 460 of flotation modules 10 (as shown in FIG. 7), the upper stop collar 60 is secured about the tubular string 29 at an upper end of the first series 460 of stacked flotation modules 10 so that the bottom end 66 of the upper stop collar 60 abuts the top end 466 of the uppermost flotation module 462 in the series 460. Further, the lower stop collar 62 is secured about the tubular string 29 at the lower end of the series 460 of stacked flotation modules 10 so that the bottom end 66 of the lower stop collar 62 abuts the bottom end 468 of the lowermost flotation module 464 in the series 460 of stacked flotation modules 10. In a further embodiment, when there are multiple series 460 of flotation modules 10 positioned about a tubular string 29, there may be an upper and lower stop collar 60, 62 positioned at the upper end and lower end, respectively, of each series 460 of flotation modules 10.

As shown in FIGS. 8-10, first section 32 and second section 34 of stop collar 30 each includes a frame structure 31. In one embodiment, the frame structure 31 is composed of a polymer composite. In a further embodiment, the polymer composite is PA66 50% GF. In one embodiment, the outer surface 33 of frame structure 31 includes a protective outer layer 96. In one embodiment, protective outer layer 96 is formed of polyurethane and is bonded to the frame structure 31.

With further reference to FIGS. 8-10, first section 32 and second section 34 of stop collar 30 are fastened together with a securing mechanism placed through bores 36 of first section 32 and second section 34. The securing mechanism may be any device, tool, component, or assembly capable of fitting into bores 36 and fastening first section 32 and second section 34 together. For example, the securing mechanism may comprise a bolt, screw, or any other similar device. In the embodiment shown in FIGS. 8 and 9, first section 32 and second section 34 are joined with hex cap bolts 38 and locking nuts 49. Hex cap bolts 38 are placed through bores 36 of both the first section 32 and second section 34 and threaded through locking nut 40, which is located on the opposite side of stop collar 30. Hex cap bolts 38 and locking nuts 40 may be made of a thermoplastic resin, as for example, Isoplast® polyurethane.

As seen in FIGS. 7-10, stop collar 39 (including each of the upper and lower stop collars 60, 62) has a top end 64, a bottom end 66, an outer surface 33, and an internal portion 68. The internal portion 68 of the upper and lower stop collars 60, 62 forms an inner bore wall 70 for accommodating the tubular string 29. Each of the upper and lower stop collars 60, 62 includes a first section 32, a second section 34, and a securing means 36, 38, 40. The first section 32 of the upper and lower stop collars 60, 62 has a C-shaped interior profile 72. The first section 32 of the upper and lower stop collars 60, 62 includes a base portion 74, a first leg portion 76, and a second leg portion 80. The base portion 74 interconnects the first leg portion 76 and the second leg portion 80. The first and second leg portions 76, 80 of the first section 32 of the upper and lower stop collars 60, 62 each has an end face 78, 82. The second section 34 of the upper and lower stop collars 60, 62 has a C-shaped interior profile 84. The second section 34 of the upper and lower stop collars 60, 62 includes a base portion 86, a first leg portion 88, and a second leg portion 92. The base portion 86 interconnects the first leg portion 88 and the second leg portion 92. The first and second leg portions 88, 92 of the second section 34 of the upper and lower stop collars 60,62 each has an end face 90, 94. The securing means 36, 38, 40 of the upper and lower stop collars 60, 62 is configured to detachably secure the first and second sections 32, 34 of each of the tipper and lower stop collars 60, 62 together in an operative arrangement about the tubular string 29.

In one embodiment, flotation module 10 includes an RFID chip 50, as shown in FIG. 1. RFID chip 50 may be located on the exterior of first section 12 and second section 14. RFID chip 50 may be used to track the length of use and location of each flotation module 10 and each half cylindrical sleeve 12 and 14 as readily understood by one of skill in the art.

FIGS. 4A and 4B show alternate embodiment flotation module 110. In this embodiment, the first section 112 and second section 114 are G-shaped when viewed from the end. When first section 112 and second section 114 are joined together, a bore 115, having an inner bore wall 410 for accommodating a tubular string 29, is formed. First section 112 has a projection 118 located on the first leg portion 17 and a recess 120 located on the second leg portion 19. Second section 114 has a projection 118 located on the second leg portion 27 and a recess 120 located on the first leg portion 21. Projections 118 and reciprocal recesses 120 are configured such that each projection 118 is capable of being received into the reciprocal recess 120 of another section in a retaining engagement. To join first section 112 to second section 114, the projection 118 of first section 112 is inserted into the reciprocal recess 120 of second section 114 and the projection 118 of second section 114 is inserted into the reciprocal recess 120 of first section 112. In this way, the first section 112 and second section 114 are joined in a dove-tail arrangement.

FIGS. 5A and 5B show an alternate embodiment of a flotation module 210. In this embodiment, the first section 212 and second section 214 are C-shaped when viewed from the end. When first section 212 and second section 214 are joined together, a bore 215 is formed. Bore 215 has an inner bore wall 410 for accommodating the tubular string 29. First section 212 has tapered projections 218 located on both first leg portion 17 and second leg portion 19 of the first section 212. Second section 214 has reciprocal recesses 220 located on both first leg portion 21 and second leg portion 27 of the second section 214. Tapered projections 218 and reciprocal recesses 220 are configured such that tapered projections 218 are capable of being received into reciprocal recesses 220 of another section in a retaining engagement. To join first section 212 to second section 214, the tapered projections 218 of the first section 212 are inserted into the reciprocal recesses 220 of second section 214. In this way, the first section 212 and second section 214 are joined in a dove-tail arrangement.

The flotation system may be affixed to a tubular string 29. In the embodiment shown in FIGS. 1-3, first and second sections 12, 14 of each flotation module 10 may be connected to one another around the outer surface of tubular string 29 such that tubular string 29 is disposed through bore 15 of each flotation module 10. Specifically, projections 18 of each section 12, 14 may be inserted into reciprocal recesses 20 on the other section 12, 14. A locking pin 28 may then be inserted through the bore formed by half bore 26 on first and second sections 12, 14. A stop collar 30 may be connected to tubular string 29 at each end of the series of flotation modules 10 such that tubular string 29 is disposed through bore 35 of each stop collar 30. Specifically, first section 32 and second section 34 may be positioned around tubular string 29, and a securing mechanism (e.g., hex cap bolts 38 and locking nuts 40) may be secured through bores 48 36 in first and second sections 32, 34.

In the same way, alternate flotation modules 110 or 210 shown in FIGS. 4A-5B may be affixed to a tubular string 29. First and second sections 112, 114 or 212, 214 of each flotation module 110 or 210 may be connected to one another around the outer surface of a tubular string 29 such that the tubular string 29 is disposed through bore 115 or 215 of each flotation module 110 or 210, respectively. Specifically in flotation module 110, projections 118 of each section 112, 114 may be inserted into reciprocal recesses 120 of the other section 112, 114. In flotation module 210, projections 218 of first section 212 may be inserted into reciprocal recesses 220 of second section 214.

Figure 11:
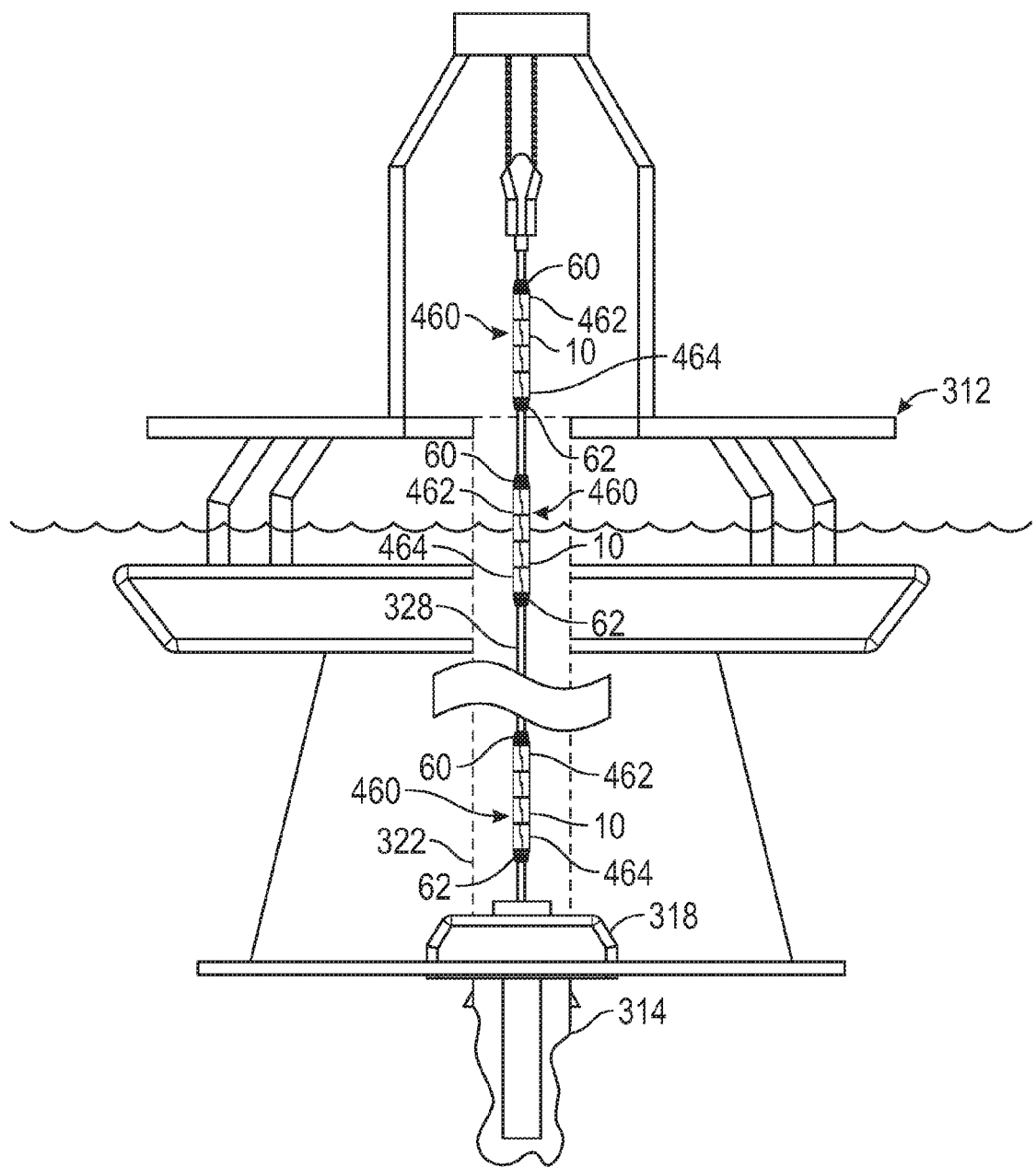
FIG. 11 is a schematic view of an offshore platform handling an embodiment of the flotation system positioned on a tubular string extending subsurface.

With reference now to FIG. 11, the flotation system may be attached to tubular string 328. In one embodiment, a series 460 of flotation modules 10 and stop collars 30 (upper and lower stop collars 60, 62) are attached to tubular string 328 on floating platform 312. Platform 312 may be an offshore drilling rig, drilling ship, or other deck or platform where subsea or subsurface (below the surface of the body of water) oil and gas operations take place. Floating platform 312 may be positioned above wellbore 314. Marine riser 322 may extend from floating platform 312 to sub-sea well head 318 positioned on the ocean floor above wellbore 314. Tubular string 328 may be a landing string, a work string, or any other tubular member lowered into a sub-sea well bore through a subsurface conduit. For example, the tubular string 328 may be used to properly position a down hole component (e.g., a casing string, bottom hole assembly containing a drilling tool with bit and mud motor, production and testing assembly) within wellbore 314. Tubular string 328 with attached flotation modules 10 may be lowered through a subsurface conduit (such as a marine riser 322), sub-sea well head 318, and into wellbore 314. Since marine riser 322 will have a fluid therein, the weight of tubular string 328 being lowered into the marine riser 322 will be reduced, according to the teachings of this invention. In this way, tubular string 310 may be lowered to a desired depth safely by reducing the rig or platform hoisting requirements. The flotation system may also be attached to tubular strings used in a production assembly for producing hydrocarbons or a testing assembly for testing a well. Furthermore, the flotation system including flotation module 10, 110 or 210 may be attached to tubular string 328 to reduce rig or platform hoisting requirements.

With further reference to FIG. 11, tubular string 328 is shown with three series 460 of flotation modules 10 attached thereto and positioned between upper stop collar 60 and lower stop collar 62. Upper stop collars 60 set adjacent to uppermost flotation module 462 in each series 460 and lower stop collars 62 set adjacent lowermost flotation module 464 in each series 460.

Flotation module 10 and system provide superior buoyancy by reducing or eliminating component parts that are not composed of buoyant material and/or which have increased weight. This feature is achieved in part, due to the novel dovetail interlocking design of the projections and recesses of the first and second sections of the flotation modules that serve to interlock the two sections of flotation modules about the tubular string by using parts composed of buoyant material. The superior buoyancy of the flotation modules achieves considerable costs savings to the rig or platform operator, which—in light of the high costs of offshore drilling and other operations—can result in operational savings in the tens of millions of dollars.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An apparatus for reducing a load force applied to an offshore platform by a tubular string comprising:
 a flotation module having an internal core made of a buoyant material, the internal core forming an inner bore wall for accommodating the tubular string, the flotation module including:
 a first section having a C-shaped interior profile and including a base portion interconnecting a first leg portion having an end face and a second leg portion having an end face;
 a second section having a C-shaped interior profile and including a base portion interconnecting a first leg portion having an end face and a second leg portion having an end face;
 an interlocking means configured to slidably engage the first and second sections into an operative arrangement about the tubular string by detachably interlocking the end faces of the first and second leg portions of the first section to the end faces of the first and second leg portions of the second section;
 wherein the interlocking means includes:
 a first projection extending from the end face of the first leg portion of the first section, the first projection having a contoured profile with a smaller diameter proximal section and a larger diameter distal section;
 a first recess positioned within the end face of the first leg portion of the second section, the first recess shaped to slidably receive the contoured profile of the first projection and provide an interlocking dovetail joint between the first and second sections.

2. The apparatus of claim 1, wherein the interlocking means further includes:
 a second projection extending from the end face of the second leg portion of the second section, the second projection having a contoured profile with a smaller diameter proximal section and a larger diameter distal section;
 a second recess positioned within the end face of the second leg portion of the first section, the second recess shaped to slidably receive the contoured profile of the second projection and provide an interlocking dovetail joint between the first and second sections.

3. The apparatus of claim 2, wherein the contoured profile of the first and second projections are each tapered.

4. The apparatus of claim 1, wherein the interlocking means further includes:
 a second projection extending from the end face of the second leg portion of the first section, the second projection having a contoured profile with a smaller diameter proximal section and a larger diameter distal section;
 a second recess positioned within the end face of the second leg portion of the second section, the second recess shaped to slidably receive the contoured profile of the second projection and provide an interlocking dovetail joint between the first and second sections.

5. The apparatus of claim 4, wherein the contoured profile of the first and second projections are each tapered.

6. An apparatus for reducing a load force applied to an offshore platform by a tubular string comprising:
 a flotation module having an internal core made of a buoyant material, the internal core forming an inner bore wall for accommodating the tubular string, the flotation module including:
 a first section having a C-shaped interior profile and including a base portion interconnecting a first leg portion having an end face and a second leg portion having an end face;
 a second section having a C-shaped interior profile and including a base portion interconnecting a first leg portion having an end face and a second leg portion having an end face;
 an interlocking means configured to slidably engage the first and second sections into an operative arrangement about the tubular string by detachably interlocking the end faces of the first and second leg portions of the first section to the end faces of the first and second leg portions of the second section;
 wherein each end face of the first and second leg portions of the first section includes an upper section with a planar surface and a lower section with a planar surface, the planar surface of the upper section extending outwardly beyond the planar surface of the lower section;
 wherein each end face of the first and second leg portions of the second section includes an upper section with a planar surface and a lower section with a planar surface, the planar surface of the lower section extending outwardly beyond the planar surface of the upper section;
 wherein the interlocking means includes:
 a first projection extending from the planar surface of the upper section of the end face of the first leg portion of the first section, the first projection having a contoured profile with a smaller diameter proximal section and a larger diameter distal section;
 a second projection extending from the planar surface of the upper section of the end face of the second leg portion of the first section, the second projection having a contoured profile with a smaller diameter proximal section and a larger diameter distal section;
 a third projection extending from the planar surface of the upper section of the end face of the first leg portion of the second section, the third projection having a contoured profile with a smaller diameter proximal section and a larger diameter distal section;
 a fourth projection extending from the planar surface of the upper section of the end face of the second leg portion of the second section, the fourth projection having a contoured profile with a smaller diameter proximal section and a larger diameter distal section;
 a first recess positioned within the planar surface of the lower section of the end face of the first leg portion of the first section, the first recess shaped to slidably receive the contoured profile of the fourth projection and provide an interlocking dovetail joint between the first and second sections;
 a second recess positioned within the planar surface of the lower section of the end face of the second leg portion of the first section, the second recess shaped to slidably receive the contoured profile of the third projection and provide an interlocking dovetail joint between the first and second sections;
 a third recess positioned within the planar surface of the lower section of the end face of the first leg portion of the second section, the third recess shaped to slidably receive the contoured profile of the second projection and provide an interlocking dovetail joint between the first and second sections;

a fourth recess positioned within the planar surface of the lower section of the end face of the second leg portion of the second section, the fourth recess shaped to slidably receive the contoured profile of the first projection and provide an interlocking dovetail joint between the first and second sections.

7. The apparatus of claim 6, wherein the first, second, third, and fourth projections are each tapered.

8. The apparatus of claim 6, wherein the flotation module further includes:

a stepped section positioned between the upper and lower sections of each end face of the first and second leg portions of the first and second sections, each stepped section including a central-planar surface portion having a top edge and a bottom edge, a lower shoulder at the bottom edge extending to the planar surface of the lower section, and an upper shoulder at the top edge extending to the planar surface of the upper section;

wherein when the first and second sections are slidably engaged in the operative arrangement:

the lower shoulder of the stepped section of the end face of the second leg portion of the second section abuts the upper shoulder of the stepped section of the end face of the first leg portion of the first section;

the upper shoulder of the stepped section of the end face of the second leg portion of the second section abuts the lower shoulder of the stepped section of the end face of the first leg portion of the first section;

the lower shoulder of the stepped section of the end face of the first leg portion of the second section abuts the upper shoulder of the stepped section of the end face of the second leg portion of the first section; and the upper shoulder of the stepped section of the end face of the first leg portion of the second section abuts the lower shoulder of the stepped section of the end face of the second leg portion of the first section.

9. The apparatus of claim 1, wherein the flotation module has a cylindrical outer surface.

10. The apparatus of claim 9, wherein the cylindrical outer surface includes a protective outer layer.

11. The apparatus of claim 10, wherein the protective outer layer is bonded to the internal core and has a thickness in the range of 7 to 10 mm.

12. The apparatus of claim 11, wherein the protective outer layer is formed of polyurethane.

13. The apparatus of claim 1, wherein the buoyant material is a syntactic foam.

14. The apparatus of claim 1, wherein the flotation module has a length in the range of 1 to 10 feet.

15. The apparatus of claim 1, wherein the flotation module has an outer diameter in the range of 14 to 22 inches.

16. The apparatus of claim 1, wherein the inner bore wall has an inner diameter in the range of 2 to 8 inches.

17. The apparatus of claim 1, wherein the flotation module includes an RFID chip.

18. The apparatus of claim 1, wherein the flotation module further includes a locking device securing the first section to the second section.

19. The apparatus of claim 1, wherein the contoured profile of the first projection is tapered.

20. A system for reducing a load force applied to an offshore platform by a tubular string comprising:

a plurality of flotation modules positioned about the tubular string in a stacked arrangement to form a first series of stacked flotation modules having an uppermost flotation module and a lowermost flotation module, each flotation module having a top end, a bottom end, an outer surface, and an internal core made of a buoyant material, the internal core forming an inner bore wall for accommodating the tubular string, each the flotation module including:

a first section having a C-shaped interior profile and including a base portion interconnecting a first leg portion having an end face and a second leg portion having an end face;

a second section having a C-shaped interior profile and including a base portion interconnecting a first leg portion having an end face and a second leg portion having an end face;

an interlocking means configured to slidably engage the first and second sections into an operative arrangement about the tubular string by detachably interlocking the end faces of the first and second leg portions of the first section to the end faces of the first and second leg portions of the second section, wherein the interlocking means includes: a first projection extending from the end face of the first leg portion of the first section, the first projection having a contoured profile with a smaller diameter proximal section and a larger diameter distal section; a first recess positioned within the end face of the first leg portion of the second section, the first recess shaped to slidably receive the contoured profile of the first projection and provide an interlocking dovetail joint between the first and second sections;

an upper stop collar and a lower stop collar, each of the upper and lower stop collars having a top end, a bottom end, an outer surface, and an internal portion forming an inner bore wall for accommodating the tubular string, each of the upper and lower stop collars including:

a first section having a C-shaped interior profile and including a base portion interconnecting a first leg portion having an end face and a second leg portion having an end face;

a second section having a C-shaped interior profile and including a base portion interconnecting a first leg portion having an end face and a second leg portion having an end face;

a securing means configured to detachably secure the first and second sections of each of the upper and lower stop collars together in operative arrangement about the tubular string;

wherein the upper stop collar is secured about the tubular string at an upper end of the first series of stacked flotation modules such that the bottom end of the upper stop collar abuts the top end of the uppermost flotation module in the first series of stacked flotation modules; and wherein the lower stop collar is secured about the tubular string at a lower end of the first series of stacked flotation modules such that the bottom end of the lower stop collar abuts the bottom end of the lowermost flotation module in the first series of stacked flotation modules.

21. The system of claim 20, wherein the internal portion of each of the upper and lower stop collars includes a polymer composite frame structure.

22. The system of claim 21, wherein the outer surface of each of the upper and lower stop collars is conically shaped.

23. The system of claim 22, wherein the outer surface of each of the upper and lower stop collars includes a protective outer layer.

24. The system of claim 23, wherein the protective outer layer is bonded to the composite frame structure and has a thickness in the range of 7 to 10 mm.

25. The system of claim 24, wherein the protective outer layer is formed of polyurethane.

26. The system of claim 20, further comprising a second series of stacked flotation modules spaced apart from the first series of stacked flotation modules.

27. A system for reducing a load force applied to an offshore platform by a tubular string comprising:
a plurality of flotation modules positioned about the tubular string in a stacked arrangement to form a first series of stacked flotation modules having an uppermost flotation module and a lowermost flotation module, each flotation module having a top end, a bottom end, an outer surface, and an internal core made of a buoyant material, the internal core forming an inner bore wall for accommodating the tubular string, each the flotation module including:
a first section having a C-shaped interior profile and including a base portion interconnecting a first leg portion having an end face and a second leg portion having an end face;
a second section having a C-shaped interior profile and including a base portion interconnecting a first leg portion having an end face and a second leg portion having an end face;
an interlocking means configured to slidably engage the first and second sections into an operative arrangement about the tubular string by detachably interlocking the end faces of the first and second leg portions of the first section to the end faces of the first and second leg portions of the second section;
an upper stop collar and a lower stop collar, each of the upper and lower stop collars having a top end, a bottom end, an outer surface, and an internal portion forming an inner bore wall for accommodating the tubular string, each of the upper and lower stop collars including:
a first section having a C-shaped interior profile and including a base portion interconnecting a first leg portion having an end face and a second leg portion having an end face;
a second section having a C-shaped interior profile and including a base portion interconnecting a first leg portion having an end face and a second leg portion having an end face;
a securing means configured to detachably secure the first and second sections of each of the upper and lower stop collars together in operative arrangement about the tubular string;
wherein the upper stop collar is secured about the tubular string at an upper end of the first series of stacked flotation modules such that the bottom end of the upper stop collar abuts the top end of the uppermost flotation module in the first series of stacked flotation modules; and
wherein the lower stop collar is secured about the tubular string at a lower end of the first series of stacked flotation modules such that the bottom end of the lower stop collar abuts the bottom end of the lowermost flotation module in the first series of stacked flotation modules;
wherein each end face of the first and second leg portions of the first section of the flotation module includes an upper section with a planar surface and a lower section with a planar surface, the planar surface of the upper section extending outwardly beyond the planar surface of the lower section;
wherein each end face of the first and second leg portions of the second section of the flotation module includes an upper section with a planar surface and a lower section with a planar surface, the planar surface of the lower section extending outwardly beyond the planar surface of the upper section;
wherein the interlocking means includes:
a first projection extending from the planar surface of the upper section of the end face of the first leg portion of the first section, the first projection having a contoured profile with a smaller diameter proximal section and a larger diameter distal section;
a second projection extending from the planar surface of the upper section of the end face of the second leg portion of the first section, the second projection having a contoured profile with a smaller diameter proximal section and a larger diameter distal section;
a third projection extending from the planar surface of the upper section of the end face of the first leg portion of the second section, the third projection having a contoured profile with a smaller diameter proximal section and a larger diameter distal section;
a fourth projection extending from the planar surface of the upper section of the end face of the second leg portion of the second section, the fourth projection having a contoured profile with a smaller diameter proximal section and a larger diameter distal section;
a first recess positioned within the planar surface of the lower section of the end face of the first leg portion of the first section, the first recess shaped to slidably receive the contoured profile of the fourth projection and provide an interlocking dovetail joint between the first and second sections;
a second recess positioned within the planar surface of the lower section of the end face of the second leg portion of the first section, the second recess shaped to slidably receive the contoured profile of the third projection and provide an interlocking dovetail joint between the first and second sections;
a third recess positioned within the planar surface of the lower section of the end face of the first leg portion of the second section, the third recess shaped to slidably receive the contoured profile of the second projection and provide an interlocking dovetail joint between the first and second sections;
a fourth recess positioned within the planar surface of the lower section of the end face of the second leg portion of the second section, the fourth recess shaped to slidably receive the contoured profile of the first projection and provide an interlocking dovetail joint between the first and second sections.

28. The system of claim 27, wherein the first, second, third, and fourth projections are each tapered.

29. The system of claim 28, wherein the flotation module further includes:
a stepped section positioned between the upper and lower sections of each end face of the first and second leg portions of the first and second sections, each stepped section including a central-planar surface portion having a top edge and a bottom edge, a lower shoulder at the bottom edge extending to the planar surface of the lower section, and an upper shoulder at the top edge extending to the planar surface of the upper section;
wherein when the first and second sections are slidably engaged in the operative arrangement:
the lower shoulder of the stepped section of the end face of the second leg portion of the second section abuts the upper shoulder of the stepped section of the end face of the first leg portion of the first section;
the upper shoulder of the stepped section of the end face of the second leg portion of the second section abuts the lower shoulder of the stepped section of the end face of the first leg portion of the first section;
the lower shoulder of the stepped section of the end face of the first leg portion of the second section abuts the upper shoulder of the stepped section of the end face of the second leg portion of the first section; and
the upper shoulder of the stepped section of the end face of the first leg portion of the second section abuts the lower shoulder of the stepped section of the end face of the second leg portion of the first section.

30. A method for reducing a load force applied to an offshore platform by a tubular string comprising the steps of:
a) providing a flotation system comprising: a plurality of flotation modules positioned about the tubular string in a stacked arrangement to form a first series of stacked flotation modules having an uppermost flotation module and a lowermost flotation module, each flotation module having a top end, a bottom end, an outer surface, and an internal core made of a buoyant material, the internal core forming an inner bore wall for accommodating the tubular string, each of the flotation modules including:
a first section having a C-shaped interior profile and including a base portion interconnecting a first leg portion having an end face and a second leg portion having an end face;
a second section having a C-shaped interior profile and including a base portion interconnecting a first leg portion having an end face and a second leg portion having an end face;
an interlocking means configured to slidably engage the first and second sections into an operative arrangement about the tubular string by detachably interlocking the end faces of the first and second leg portions of the first section to the end faces of the first and second leg portions of the second section, wherein the interlocking means includes: a first projection extending from the end face of the first leg portion of the first section, the first projection having a contoured profile with a smaller diameter proximal section and a larger diameter distal section; a first recess positioned within the end face of the first leg portion of the second section, the first recess shaped to slidably receive the contoured profile of the first projection and provide an interlocking dovetail joint between the first and second sections; and
an upper stop collar and a lower stop collar, each of the upper and lower stop collars having a top end, a bottom end, an outer surface, and an internal portion forming an inner bore wall for accommodating the tubular string, each of the upper and lower stop collars including:
a first section having a C-shaped interior profile and including a base portion interconnecting a first leg portion having an end face and a second leg portion having an end face;
a second section having a C-shaped interior profile and including a base portion interconnecting a first leg portion having an end face, and a second leg portion having an end face;
a securing means configured to detachably secure the first and second sections of each of the upper and lower stop collars together in operative arrangement about the tubular string;
wherein the upper stop collar is secured about the tubular string at an upper end of the first series of stacked flotation modules such that the bottom end of the upper stop collar abuts the top end of the uppermost flotation module in the first series of stacked flotation modules; and
wherein the lower stop collar is secured about the tubular string at a lower end of the first series of stacked flotation modules such that the bottom end of the lower stop collar abuts the bottom end of the lowermost flotation module in the first series of stacked flotation modules;
b) lowering the tubular string through a subsurface conduit, wherein the load force applied to the offshore platform by the tubular string is reduced due to a buoyancy effect of the first series of stacked flotation modules.

31. The method of claim 30, wherein the subsurface conduit is a marine riser.

32. The method of claim 31, further comprising the step of:
a1) providing a second series of stacked flotation modules on the tubular string spaced apart from the first series of stacked flotation modules.

33. The method of claim 32, further comprising the step of:
c) lifting the tubular string through the marine riser, wherein the load force applied to the offshore platform by the tubular string is reduced due to a buoyancy effect of the first and second series of stacked flotation modules.

* * * * *

UNITED STATES PATENT AND TRADEMARK OFFICE
CERTIFICATE OF CORRECTION

PATENT NO. : 9,908,594 B2
APPLICATION NO. : 15/251762
DATED : March 6, 2018
INVENTOR(S) : Christopher Eric von Eberstein It is certified that error appears in the above-identified patent and that said Letters Patent is hereby corrected as shown below:

On the Title Page

At (73) change assignee name from "Expert E&P Consultants, L.L.C., Madisonville, LA (US)" to
-- William von Eberstein, Madisonville, LA (US) --

Signed and Sealed this
Eleventh Day of December, 2018

Andrei Iancu
*Director of the United States Patent and Trademark Office*